[19] United States Patent
Sturmer et al.

[11] 4,044,522
[45] Aug. 30, 1977

[54] STEEL-CONCRETE COMBINATION ELEMENT FOR LINING VESSELS SUCH AS STORAGE TANKS, PRESTRESSED CONCRETE REACTOR PRESSURE VESSELS, AND THE LIKE

[75] Inventors: Horst Sturmer, Bergneustadt; Klaus Schweim, Gummersbach, both of Germany

[73] Assignee: L. & C. Steinmuller G.m.b.H, Gummersbach, Germany

[21] Appl. No.: 598,548

[22] Filed: July 23, 1975

[30] Foreign Application Priority Data

July 24, 1974 Germany .............................. 2435521

[51] Int. Cl.² .......................... E04C 2/04; E04B 1/54
[52] U.S. Cl. ..................................... 52/599; 52/600; 52/454; 52/334
[58] Field of Search ................ 52/448, 588, 578–582, 52/595, 596, 599, 600, 446, 269, 268, 334, 600, 265, 599, 758 B

[56] References Cited
U.S. PATENT DOCUMENTS

| 139,415 | 5/1873 | Mulford | 52/454 |
| 995,069 | 6/1911 | Lewen | 52/598 |
| 1,922,774 | 8/1933 | Maul et al. | 52/446 |
| 2,245,688 | 6/1941 | Krueger | 52/269 |
| 2,245,690 | 6/1941 | Krueger | 52/269 |
| 2,270,297 | 1/1942 | Hensel | 52/596 |
| 2,613,768 | 10/1952 | Gillett | 52/758 B |
| 2,797,448 | 7/1957 | Revell et al. | 52/598 |

FOREIGN PATENT DOCUMENTS

| 1,245,055 | 9/1960 | France | 52/595 |
| 1,124,861 | 10/1956 | France | 52/599 |

Primary Examiner—Price C. Faw, Jr.
Assistant Examiner—James L. Ridgill, Jr.
Attorney, Agent, or Firm—Walter Becker

[57] ABSTRACT

Compound elements for lining such vessels as storage tanks, prestressed concrete reactor pressure vessels, and other gastight areas for use in nuclear reactor construction. The compound elements have a leakproof, plate-shaped metal base, and comprise anchors, contact elements, and reinforced concrete. The contact elements and base of one compound element are welded to a contact element and the base of an adjacent combination element so as to confine with each other a hollow chamber.

1 Claim, 3 Drawing Figures

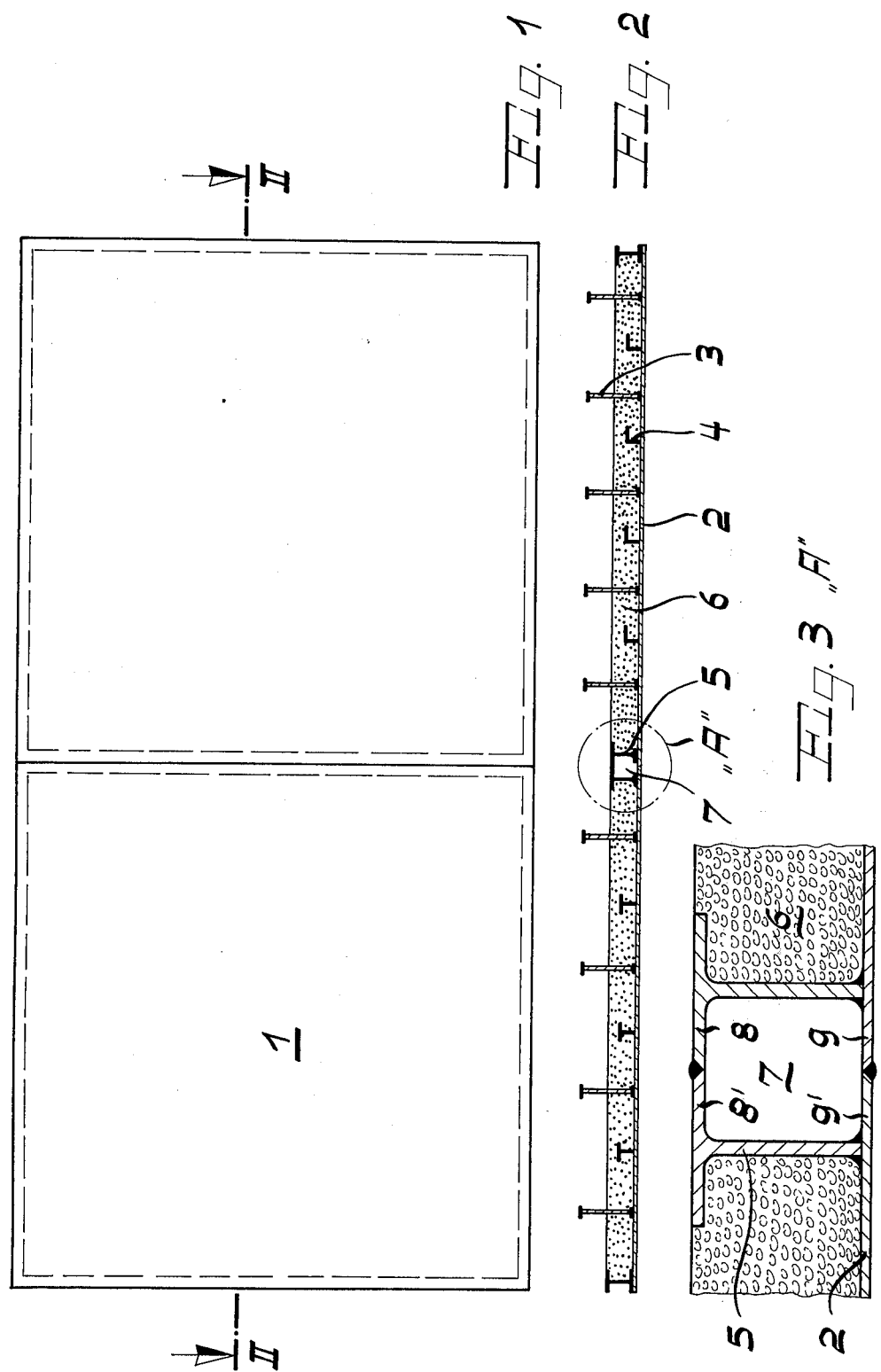

STEEL-CONCRETE COMBINATION ELEMENT FOR LINING VESSELS SUCH AS STORAGE TANKS, PRESTRESSED CONCRETE REACTOR PRESSURE VESSELS, AND THE LIKE

The present invention relates to an element for lining containers such as storage tanks, prestressed concrete reactor pressure vessels, and other gastight container and chambers to be lined for use in nuclear reactor construction.

In order to produce the liners and the prestressed concrete reactor pressure vessels, it is necessary to make an expensive supporting frame for absorbing or taking up the concreting pressure. The supporting frame has simultaneously to support and secure the liner, that is, the lining of the prestressed concrete reactor pressure container, while the latter is being set up. Drawbacks of this known method are the tremendous preparation and assembly times.

It is further known, in order to save structural or framework costs, to undertake a partial concreting of the prestressed concrete reactor pressure vessel after manufacture of the entire liner for said vessel. The drawback of this known assembly system is that the entire liner, including additional fittings, must be made or manufactured.

It is an object of the present invention to produce an element for lining containers, which element will insure that, without expensive fittings, the concreting pressure, which occurs during the concreting of the concrete vessel, will be safely and reliably absorbed.

This object and other objects and advantages of the invention will appear more clearly from the following specification in connection with the accompanying drawing, in which:

FIG. 1 shows two adjacent elements according to the present invention, the two elements being welded together.

FIG. 2 is a section taken along the line II—II of FIG. 1.

FIG. 3 is an enlargement of the encircled area designated "A" in FIG. 2.

The element according to the present invention for lining storage tanks, prestressed concrete, reactor pressure containers and the like is characterized primarily in that the element is designed as a self-supporting concrete-steel compound element with a plate-shaped metallic base element having one side intended to face the interior of the respective container, and that on the opposite side of said base element there are provided anchoring elements, while along the circumferential rim portion of said compound element reinforcing and confining elements for the concrete are so arranged that their outer edges are adapted to be welded to the outer edges of adjacent reinforcing and confining elements, and the outer edges of the base element are adapted to be welded to the outer edge of adjacent base elements whereby hollow configurations are formed at the welded-together edges.

The outstanding advantage of the invention consists primarily in that the element for lining containers, prior to its being set up, may be tested at the place of manufacture for the density or thickness required for the nuclear reactor construction. Furthermore, the two welding seams which close up the hollow configuration formed by the reinforcing and confining elements of two adjacent compound elements, may in an advantageous and known manner, be examined at any time during the assembly, the start up, or the operation.

A further advantage of the elements according to the present invention consists in their normalization or standardization, which makes possible mass fabrication and a manufacture at lower prices.

By limiting a large portion of the frameworks required for assembly at the building site, the preparation and assembly time, and thereby the assembly costs, are reduced to a minimum.

Referring now to the drawing in detail, the compound element 1 comprises a plate-shaped metal base element 2, the anchor elements 3, 4 which also serve to reinforce the base element 2, reinforcement and confining elements 5, and reinforced concrete 6.

The compound elements 1 are put together as follows: the element 1, which is provided with a base element 2, already examined at the manufacturing plant to insure leakproofness, and with the concrete 6, is raised up vertically at the place of assembly by means of a hoisting device and is likewise welded to an adjacent, previously raised element 1 so as to be leakproof. The welding seams extend along the outer edges 8 of flanges 8' of the reinforcement and confining elements or rim 5, as well as along the outer edges 9 of flanges 9' of the base element 2, thereby forming the hollow space 7. The welding seams of the reinforcement elements 5 as well as the base elements 2 may be examined at any time during assembly.

After manufacture and examination of the lining, which comprises the individual elements 1, the concrete vessel is manufactured. The elements 1 which form the lining are supported by the anchoring elements 3 in the concrete of the concrete vessel.

It is also quite possible, according to the present invention, to make the reinforcement and contact elements in any technically significant shape, such as U-sections, the legs of which are connected to the base element, or as staggered T-sections with webs mounted between them for better control or inspection of the welding seams, as well as other angle profiles which form a hollow space. In addition thereto, it is possible to design the steel-concrete compound element as segments in order to conform to the exact curvatures of the vessel.

It is, of course, to be understood that the present invention is, by no means, limited to the specific showing of the drawing, but also comprises any modifications within the scope of the appended claims.

What we claim is:

1. A self-supported compound element of steel and concrete for joining to similar elements for lining containers, including a steel plate base member, a plurality of individual anchoring means fixed on one surface of said plate, a rim along at least one edge of said plate and fixed on the same surface as said anchoring means, concrete cast on said surface of said plate and having a surface substantially parallel with the plate surface with said anchoring means extending into said concrete and said rim confining said concrete along said edge, certain of said anchoring means extending above said concrete surface and said rim, said rim having flanges projecting laterally outwardly on the side opposite said concrete to form one-half of a hollow formation, the rim formed with flanges for engaging flanges of an adjoining element to form a closed hollow space between the elements when welded together along said flanges, so welding seams may be inspected when said elements are assembled to form a lining.

* * * * *